United States Patent
Collins

(10) Patent No.: US 7,165,812 B2
(45) Date of Patent: Jan. 23, 2007

(54) SIDE PLATE WITH INTEGRAL BOSS

(75) Inventor: Cecil A Collins, Sterling Heights, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 352 days.

(21) Appl. No.: 10/404,740

(22) Filed: Apr. 1, 2003

(65) Prior Publication Data

US 2003/0189371 A1    Oct. 9, 2003

Related U.S. Application Data

(62) Division of application No. 09/969,445, filed on Oct. 2, 2001, now Pat. No. 6,588,087.

(51) Int. Cl.
*B60N 2/02* (2006.01)

(52) U.S. Cl. .................... 297/362.12; 297/362.13; 297/362.14

(58) Field of Classification Search .......... 297/362.12, 297/362.13, 362.14; 248/903, 188; 72/333, 72/334, 379.2
See application file for complete search history.

(56) References Cited

U.S. PATENT DOCUMENTS

| | | | | |
|---|---|---|---|---|
| 532,355 A * | 1/1895 | Bellinger | .................... | 72/349 |
| 1,688,534 A * | 10/1928 | Einstein | ...................... | 74/358 |
| 1,793,296 A * | 2/1931 | Wilson | ........................ | 72/333 |
| 2,332,175 A * | 10/1943 | Sinclair | ....................... | 72/333 |
| 2,460,721 A * | 2/1949 | Thompson | .................. | 72/333 |
| 4,070,895 A * | 1/1978 | Yamada et al. | ................ | 72/334 |
| 4,291,914 A * | 9/1981 | Mizelle | ................. | 297/362.14 |
| 4,708,392 A * | 11/1987 | Werner et al. | ......... | 297/354.12 |
| 4,715,656 A * | 12/1987 | Walk et al. | ................ | 297/362 |
| 4,832,405 A * | 5/1989 | Werner et al. | ......... | 297/362.12 |
| 5,320,413 A * | 6/1994 | Griswold et al. | ...... | 297/362.12 |
| 5,580,026 A * | 12/1996 | Newcomer | .................. | 248/523 |
| 5,795,024 A * | 8/1998 | Collins et al. | ......... | 297/362.14 |
| 5,813,725 A | 9/1998 | Robinson | | |
| 5,947,560 A | 9/1999 | Chen | | |
| 6,158,266 A * | 12/2000 | Elipe et al. | ................ | 72/379.2 |
| 6,386,637 B1 * | 5/2002 | Okazaki et al. | ........ | 297/378.12 |
| 6,543,855 B1 * | 4/2003 | Bruck | .................... | 297/440.21 |
| 6,547,332 B1 * | 4/2003 | Pejathaya | .............. | 297/362.14 |
| 6,568,758 B1 * | 5/2003 | Berg et al. | ............. | 297/362.12 |
| 6,649,276 B1 * | 11/2003 | Kanemitsu et al. | ......... | 428/579 |
| 6,655,741 B1 * | 12/2003 | Bonk | .................... | 297/362.14 |

FOREIGN PATENT DOCUMENTS

JP        05113485 A  *  5/1993

* cited by examiner

*Primary Examiner*—Peter M. Cuomo
*Assistant Examiner*—Sarah B. McPartlin
(74) *Attorney, Agent, or Firm*—Harness, Dickey & Pierce, P.L.C.

(57) ABSTRACT

A side plate according to the invention includes a main body, a first cup-shaped feature formed of the main body, and a second cup-shaped feature formed of the first cup-shaped feature, wherein the second cup-shaped feature has a diameter smaller than the first cup-shaped feature and is oriented in the direction opposite the first cup-shaped feature. The first and second cup-shaped features form a frustum-conical segment extending generally outward from the main body. The frustum-conical segment includes a plurality of threads located about a length of a hole formed therethrough. A contact surface is disposed about the hole.

16 Claims, 8 Drawing Sheets

SIDE PLATE WITH INTEGRAL BOSS

CROSS-REFERENCE TO RELATED APPLICATIONS

This application is a divisional of U.S. patent application Ser. No. 09/969,445 filed on Oct. 2, 2001 now U.S. Pat. No. 6,588,087. The disclosure of the above application is incorporated herein by reference.

FIELD OF THE INVENTION

The present invention relates to actuators for a reclining seat assembly. More particularly, the present invention relates to an actuator side plate having an integrated threaded boss for mounting the actuator within a seat assembly, as well as a method of manufacturing the side plate.

BACKGROUND AND SUMMARY OF THE INVENTION

Virtually all motor vehicles are now equipped with front seats having a recliner mechanism that can be selectively actuated to adjust the angular position of the seatback between an upright position and a fully reclined position relative to the seat bottom. Most recliner mechanisms include a body portion that is secured to a frame disposed within the seat bottom and connected to an extending arm for pivoting the seat-back frame.

The body portion of many conventional recliners is secured to the frame by a threaded trunnion. The trunnion typically includes a main body portion disposed between a set of side plates. Two bosses extend through apertures located in the side plates to fix the trunnion to the body portion of the actuator mechanism. Conventionally, an annular flange of each boss is staked to the side plate to secure the bosses and trunnions to the side plate. The assembly and staking of the boss and trunnion assembly is relatively time consuming and expensive.

The actuator according to the invention includes a recliner mechanism having an integrally formed threaded boss, thereby eliminating the trunnion disposed between the side plates and simplifying the side-plate construction and method of assembling the recliner mechanism. The actuator side plate having an integrally formed boss portion generally includes a frustum conical wall segment extending generally outward, a contact surface located at the distal end of the frustum conical wall segment, and a collar extending generally inward from the contact surface to operatively connect the side plate to a seat frame.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
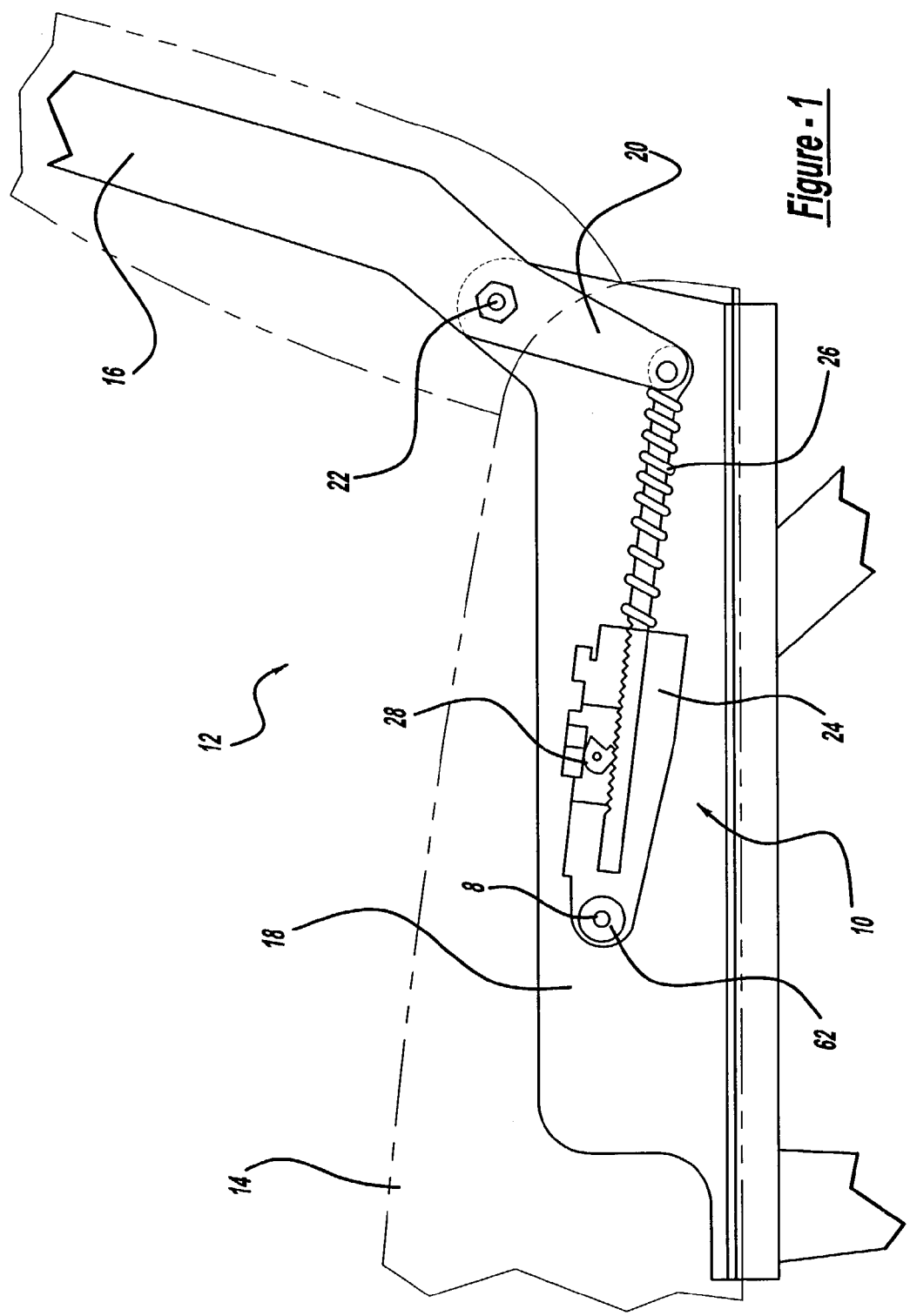
FIG. 1 is a side view of a seat assembly according to the invention.

The present invention relates to a recliner assembly 10 incorporated into a seat assembly 12 having an upholstered seat bottom 14 and an upholstered seatback 16, as shown in FIG. 1. Seat assembly 12 is of a type contemplated for use as the front seat in a motor vehicle. Seat bottom 14 includes a structural frame, with one of its lateral side rails being identified by reference numeral 18. The structural frame for seatback 16 includes a pair of lateral support arms 20 (one shown), each of which is rotatably attached by a pivot 22 to seat frame 18. As such, seatback 16 is supported for angular movement relative to seat bottom 14. As shown and discussed, recliner assembly 10 is a linear recliner assembly operable for permitting selective reclining movement of seatback 16 relative to seat bottom 14 between an upright position and a fully reclined position. While a linear recliner assembly is shown and described, the present invention also contemplates use of a rotary recliner mechanism, such as that shown in U.S. Pat. No. 5,813,725, the disclosure of which is incorporated herein by reference.

As shown in FIG. 1, linear recliner assembly 10 generally includes a housing 24 fixed to seat frame 18, a recliner rod 26 attached to support arm 20 of seatback 16 and supported for sliding movement relative to housing 24, a latching mechanism 28 for releasably latching a recliner rod 26 to housing 24, and a recliner actuator mechanism for controlling actuation of latching mechanism 28. Housing 24 is pivotably attached to seat frame 18 by a fastener 8 disposed through seat frame 18 and an integrally formed boss 62.

Figure 2:
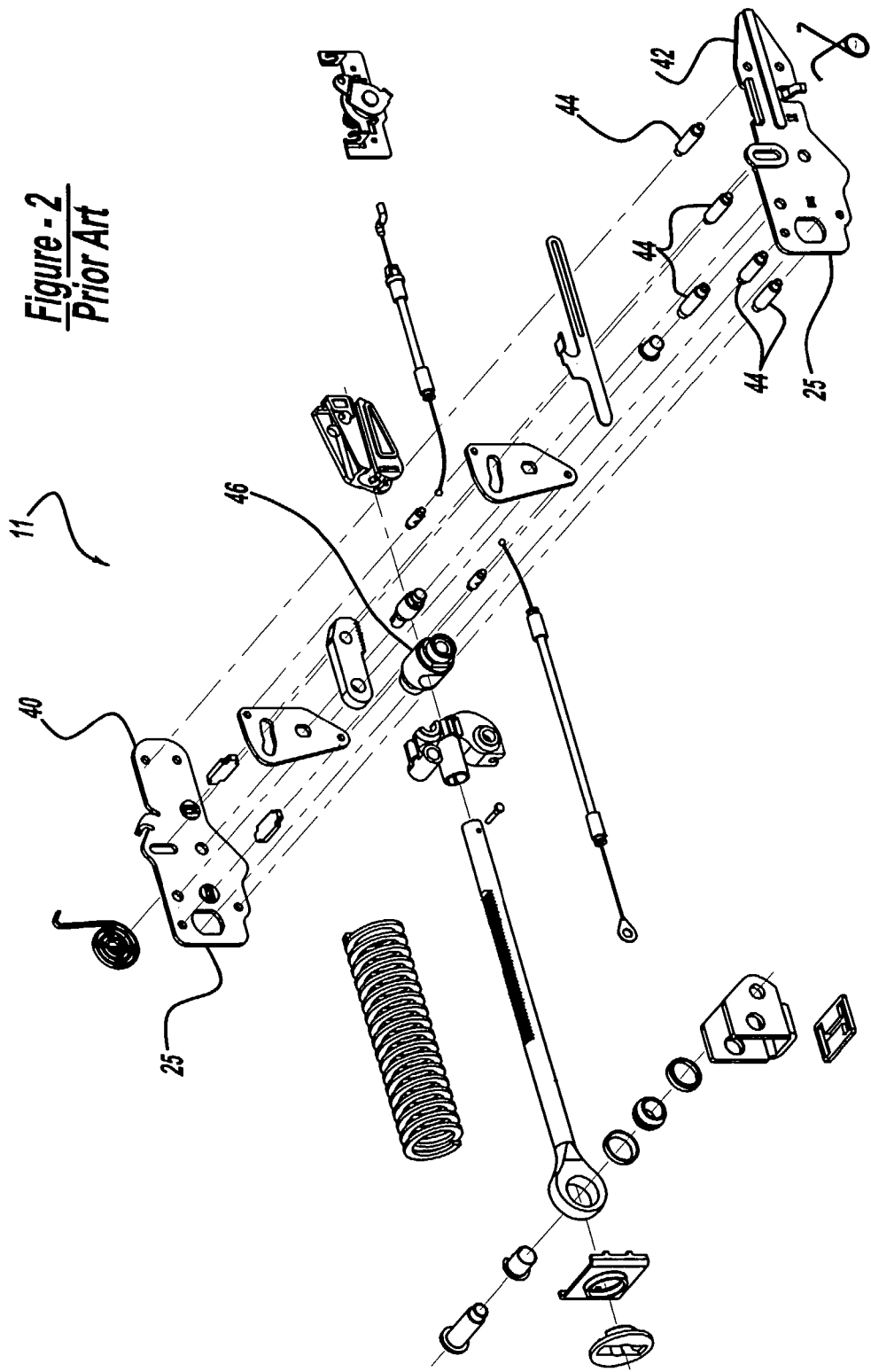
FIG. 2 is an exploded view of a prior art linear actuator.

With reference to FIG. 2, a prior art linear recliner assembly 11 is shown. In use, prior art linear recliner assembly 11 is pivotably attached to a seat frame by a fastener secured to a housing 25, which is generally defined by inner and outer plates 40 and 42 interconnected by a plurality of spacing rivets 44 and a trunnion 46. Trunnion 46 is a generally cylindrical member having a threaded hole axially disposed therethrough for operatively connecting a linear recliner assembly to a seat frame. Trunnion 46 further includes a hole disposed diametrically therethrough for a receiving reclining rod when a seat back of the present invention is in the reclined position.

Figure 3:
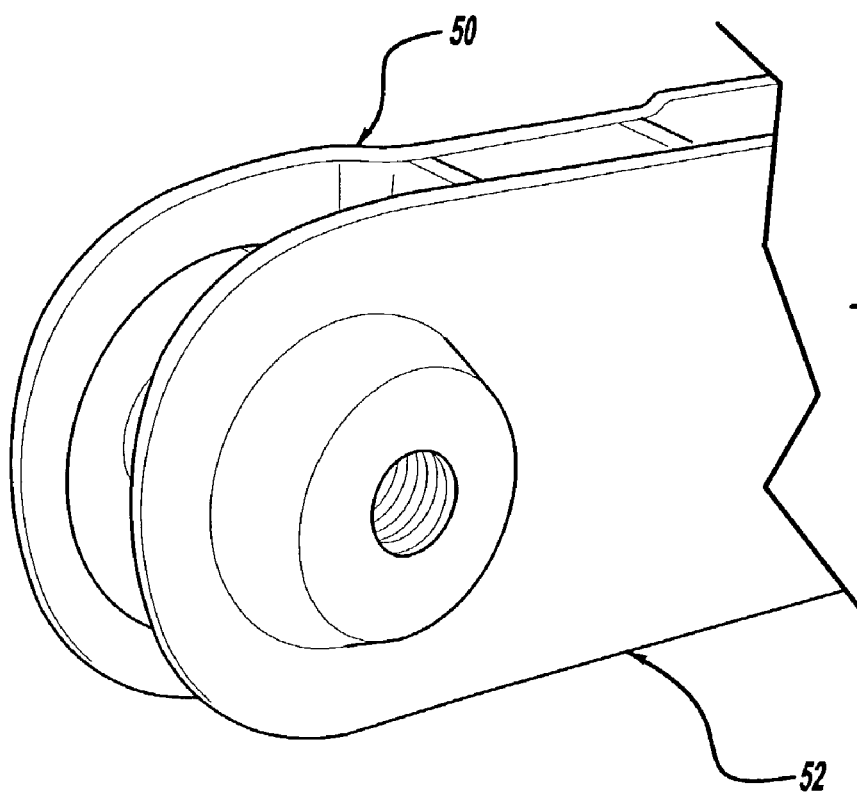
FIG. 3 is a perspective view of a linear actuator according to the present invention.

The linear actuator assembly 10 of the present invention, as shown in FIG. 3, includes inner and outer side plates 50, 52, each including an integrally formed boss 62. Integrally formed bosses 62 on inner and outer side plates 50, 52 operatively connect the body portion 60 of linear recliner assembly 10 to seat frame 18 through the use of fasteners 8, which can be any suitable fastener including, but not limited to, a screw, stud, rivet, or weld. For simplicity in the description, integrally formed boss 62 will be discussed as it relates to side plate 50 with the understanding that integrally formed boss 62 is similar in structure and function for each side plate 50, 52.

By using an integrally formed boss 62, a trunnion 46 is no longer required to connect linear recliner assembly 10 to seat frame 18. The elimination of trunnion 46 reduces the number of parts required to create a linear actuator assembly, and therefor reduces the total cost for linear recliner assembly 10. The elimination of trunnion 46 also reduces the cost of the assembly process and therefore reduces the overall cost to assemble the linear recliner assembly. Additionally, in the present manufacturing process, a plurality of stakes are made around the perimeter of the bosses that extend from trunnion 46 to secure the trunnion to the side plate 50. The use of the integrally formed boss 62 eliminates this step of the manufacturing process. Moreover, by using an integrally formed boss 62 rather than trunnions, the surface area that is in contact with the seat frame is increased. Increased surface area adjacent to seat frame 18 causes side plate 50 to more directly engage the seat frame 18. This direct engagement promotes more effective transfer of forces from linear recliner assembly 10 to seat frame 18.

Figure 4:
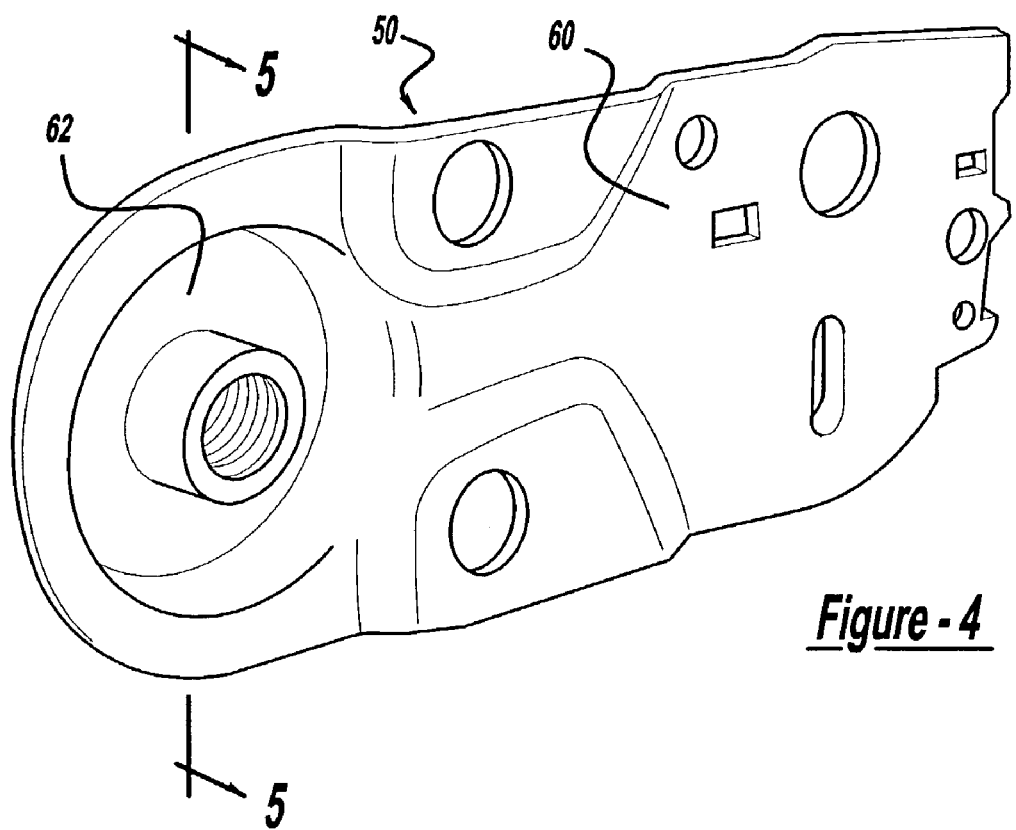
FIG. 4 is a perspective view of a side plate of the linear actuator of FIG. 2.

As illustrated in FIG. 4, side plate 50 of the present invention generally includes a body portion 60 and integrally formed boss 62. Body portion 60 houses and supports recliner rod 26, latching mechanism 28, and recliner actuator mechanism. Integrally formed boss 62 attaches linear recliner assembly 10 to seat frame 18.

Figure 5:
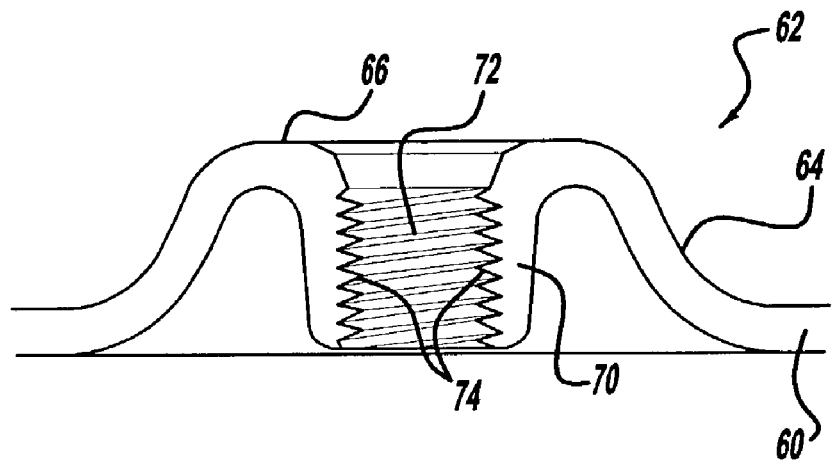
FIG. 5 is a cross sectional view of the side plate of FIG. 4 along plane 5—5.

As shown in FIG. 5, integrally formed boss 62 protrudes generally outward from the body portion 60 at one end of the side plate 50. Integrally formed boss 62 includes a frustum-conical wall segment 64 interconnected to a disk-shaped thickened wall segment 66. Thickened wall segment 66 is disposed generally parallel to body portion 60 of side plate 50 to achieve desired orientation of linear recliner assembly 10 relative seat frame 18. Extending generally inward from thickened wall segment 66 is a cylinder 70, which is oriented concentric and perpendicular to thickened wall segment 66 and includes a hole 72 disposed therethrough for fastener 8. Cylinder 70 includes a plurality of threads 74 disposed about hole 72 for operatively receiving fastener 8.

In determining the size and orientation of the integrally formed boss portion, recliner assembly 10 should securely mount to seat frame 18 and effectively transfer forces therebetween. Therefore, thickened wall segment 66, which typically abuts seat frame 18 when in use, preferably has a thickness twenty-five to seventy-five percent greater than body portion 60, but can be anywhere from five to three hundred percent greater or more. For example, a 3 mm body portion 60 is preferably thickened to approximately 5 mm.

In designing the integrally formed boss 62, the size and shape of thickened wall segment 66 and conical wall segment 64 is based on the expected load. The initial diameter (adjacent body 60) of the frustum-conical wall segment 64 is preferably complimentary to the size of side plate 24 in order to efficiently distribute the load of forces acting on the integrally formed boss 62 to the remainder of the recliner assembly 10. Also, the height of the frustum-conical wall segment 64 corresponds to the length of fastener 8 which is used to attach recliner assembly 10 to the seat frame 18. Further, fastener 8 should be selected to effectively transfer the load of forces acting on the integrally formed boss 62. If the height of the frustum-conical wall segment 64 is larger than the corresponding length of the fastener, an increased moment arm is created, thus leading to increased torsional moments on recliner assembly 10. In one example, a frustum-conical wall segment 64 that protrudes from an initial diameter of 41.68 mm to a final diameter of 25.4 mm at a height of 11.2 mm with a 10 mm diameter hole 72 to obtain desired strength and load transferring characteristics for a 2 mm thick side plate 50.

With respect to the thickness of thickened wall segment 66, a larger thickness improves the overall strength of integrally formed boss 62. When forming side plate 50, thickened wall segment 66 is thickened through a reducing step in progressive forming, wherein a dome-shaped structure is reduced in diameter and the thickness of thickened wall segment 66 of the dome-shaped structure is increased. As such, the exact size of thickened wall portion 66 is variable. However, it is noted that a larger contact surface area and thickened wall segment 66 more effectively distributes the load from seat back 16 through arm 20 to the seat frame 18 through integrally formed boss 62.

As shown in the drawings, the edges adjoining frustum conical wall segment 64, thickened wall segment 66, and cylinder 70 are radiused surfaces. Radiused surfaces, as opposed to sharp edges, increases the strength and maximum load capacity of integrally formed boss 62 by reducing stress concentration at the edges. Increasing the size of the radiused surfaces to a maximum value maximizes stress reduction, but a value less than an allowable maximum value may sufficiently reduce the stress concentration to acceptable levels. The radiused surfaces between the segments of the integrally formed boss 62 are approximately equal to the thickness of side plate 50. For the above-mentioned example, the radius is approximately 2 to 3 mm, depending on the application.

Side plate 50 may be constructed from 050 XLF hot-rolled steel or 1008 or 1010 cold-rolled steel. The thickness of the sheet, and thus side plate 50, is dependent on the application for which the recliner assembly will be used. For the above example, a sheet thickness of 2 mm is used. In applications where all attachments for the seat belt restraints are located on the seat assembly, a thickness of 3 mm may be used to increase the strength of the assembly to accommodate the increased forces applied to the seat frame.

Figure 6:
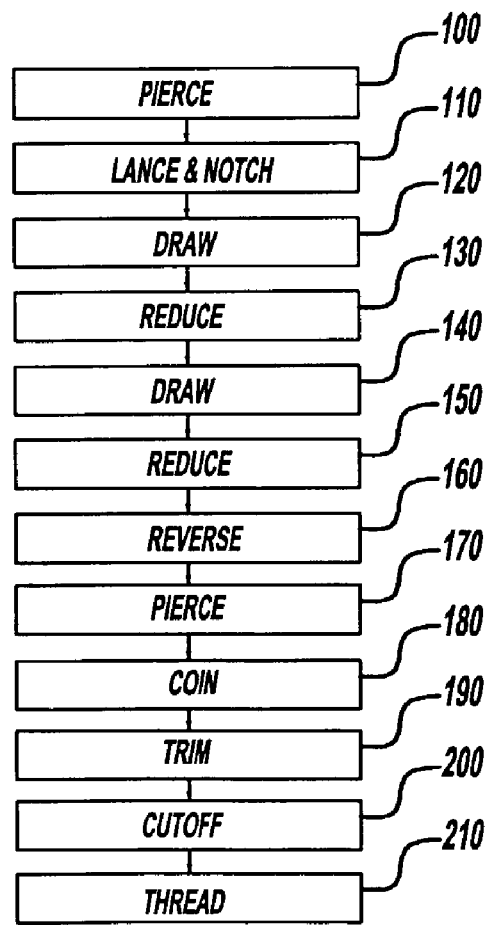
FIG. 6 is a flow diagram illustrating a method of forming the side plate of FIG. 4 according to the invention.

The method by which the integrated boss 62 of a side plate for a recliner mechanism is constructed is generally illustrated in FIG. 6 by Steps 100 through 210. The steps accomplish the formation of a side plate 50 having an integrally formed boss 62 while they are integral parts of a continuous sheet of cold-rolled steel, thereby saving time, material and handling expenses. Boss 62 is threaded as a separate step after the continuous sheet has been cut from a carrier sheet. Because the manufacture of side plate 50 involves a series of separate drawing and reducing operations in a progressive die, the sheet material is advanced through the system with intermittent steps of precisely equal length and the spacing of the successive blanks comprising the continuous sheet remain precisely the same until the side plates are cut from the carrier sheet. Also, because each drawing and reducing operation performed on a side plate blank requires a generally radial "pulling in" of the blank and a reduction of the planar area of the blank, the individual blanks must be kept operatively connected to the continuous sheet and to each other without deviation from the initial predetermined spacing of the blanks.

Figure 7:
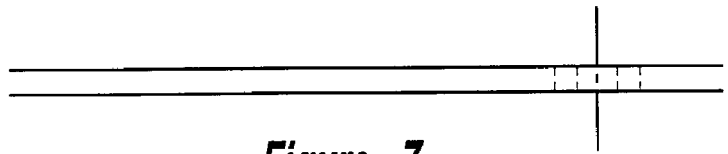
FIG. 7 is a partial side view of a side plate after the piercing step in the method of FIG. 6.
Figure 8:
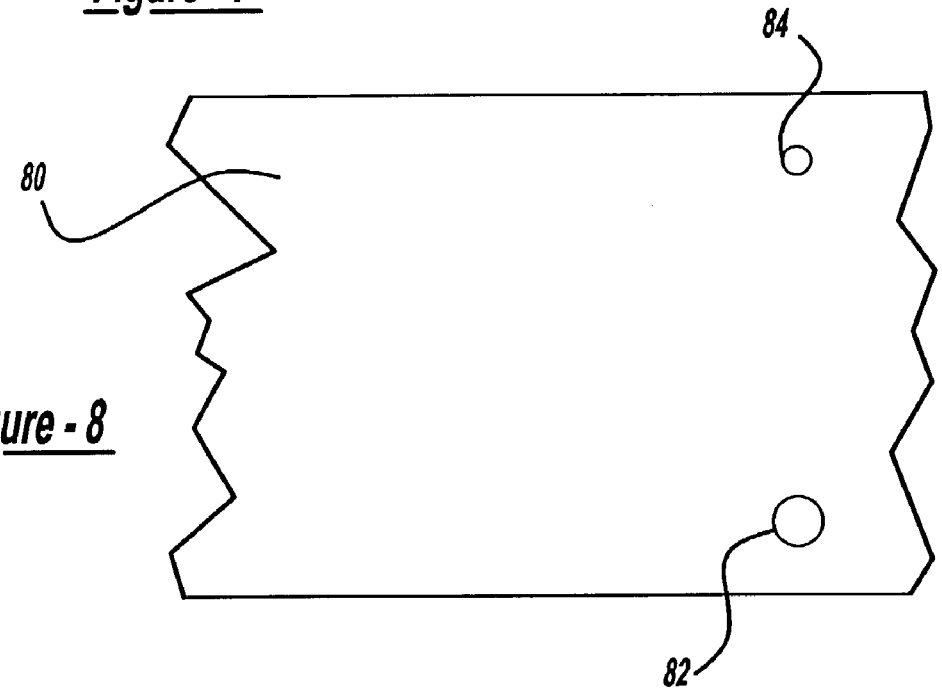
FIG. 8 is a partial top view of the side plate shown in FIG. 7.
Figure 9:
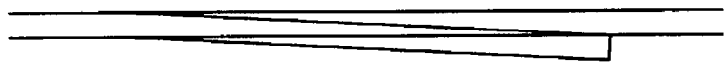
FIG. 9 is a partial side view of a side plate after the lancing and notching step in the method of FIG. 6.

In Step 100, a continuous sheet 80 of appropriate material is fed into the first station of the progressive stamping die. As shown in FIGS. 7 and 8, two holes are pierced through the sheet 80. The first hole, a pilot hole 82, is located near the edge of the sheet 80. The second hole, a progression hole 84, is pierced at a point perpendicularly inward on the sheet 80 from the pilot hole 80 at a distance beyond the desired width of side plate 50. The sheet 80 is then fed, or moved, a specified amount to allow the next sequential station to perform a forming process, at which time the first station pierces two new holes 82, 84 in the sheet 80. For example, if the sheet 80 is moved 2.80 inches, this is the spacing used throughout the progressive die process.

Figure 10:
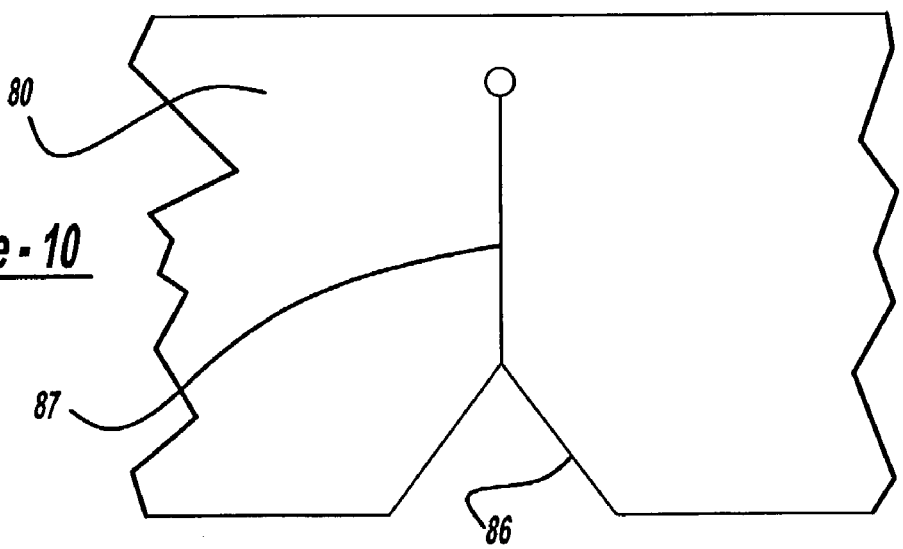
FIG. 10 is a partial top view of the side plate shown in FIG. 9.
Figure 12:
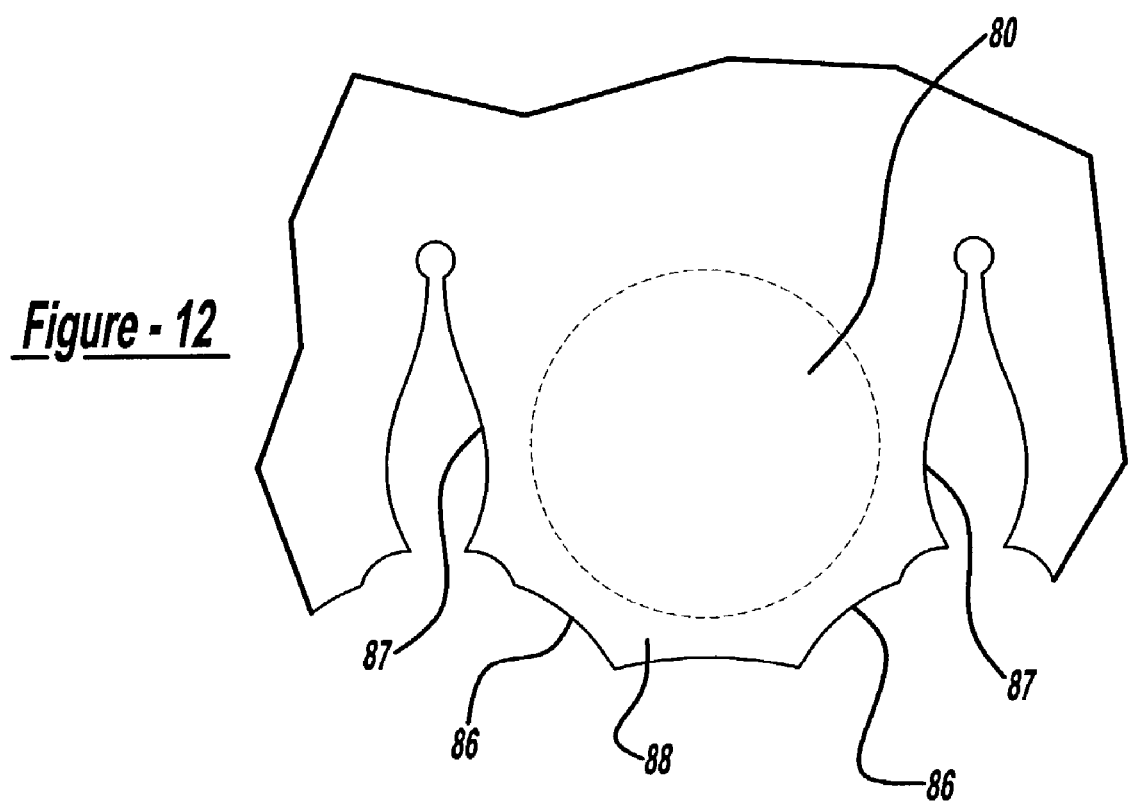
FIG. 12 is a partial top view of the side plate shown in FIG. 11.

In Step 110, the second station of the progressive die performs a lance and notch of the sheet as shown in FIGS. 7 and 10. A notch 86 is cut extending tangentially from each side of the pilot hole 82 pierced in Step 100 toward the nearby edge of the sheet 80. For example, each side of the notch 86 is oriented at an angle of approximately forty-five degrees with respect to the edge of the sheet 80 to form a notch having sides that are oriented approximately perpendicular relative to each other. A lancing operation is also performed to create a separation 87 of the sheet between the pilot hole 82 and the progression hole 84. The lance and notching process of Step 110 forms a peninsular section 88, as shown in FIG. 12. Again, the sheet 80 is advanced to allow the die to form the next plate 50. With each advancement of the sheet 80 between stations, it is understood that the advancement is a predetermined distance to the next sequential station.

Figure 11:
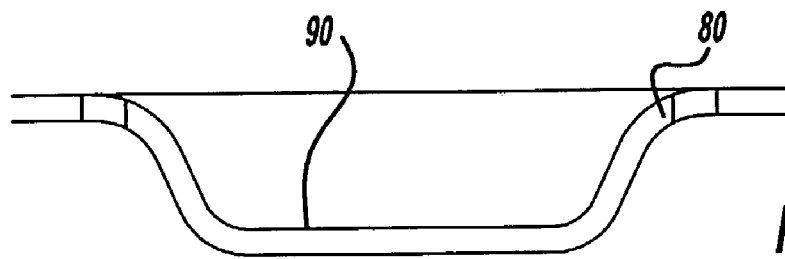
FIG. 11 is a cross sectional view of a side plate after the first drawing step in the method of FIG. 6.

In Step 120, the peninsular section 88 formed by the lance and notching process of Step 110 is drawn to form a cup-shaped feature. Specifically, the edge of the peninsular section 88 is restrained by a hold-down die and impacted generally in the center of the peninsular section 88 by a round-over punch to form a first cup-shaped feature 90 on the sheet 80, as shown in FIG. 11. The height of the first cup-shaped feature 90 preferably corresponds to the desired height of the integrally formed boss 62. It is also noted that formation of the first cup-shaped feature 90 may cause a portion of the sheet 80 adjacent to the first cup-shaped feature to be "pulled" inward by the deformation of the adjacent material. As shown in FIG. 12, this causes the notch 86 and separations 87 to form an arc shape.

Figure 13:
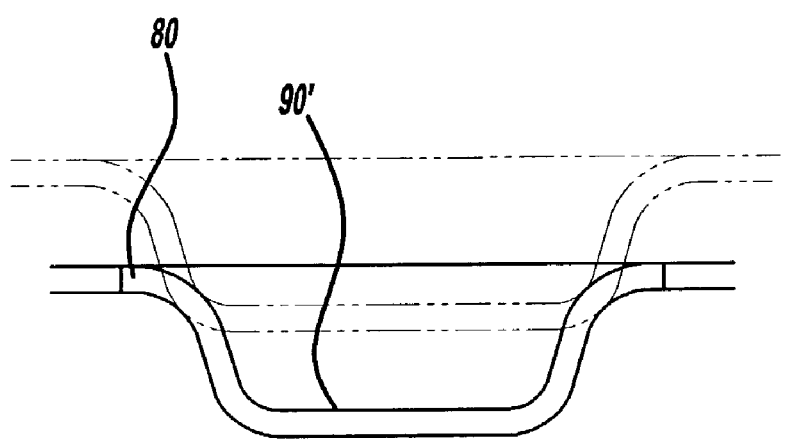
FIG. 13 is a cross sectional view of a side plate after the first reduction step in the method of FIG. 6.

In Step 130, the first cup-shaped feature 90 is reduced to form a smaller first cup-shaped feature 90' having approximately the same height and a smaller diameter, as shown in FIG. 13. In this step, the perimeter of the first cup-shaped feature 90 is placed around a ring die and impacted toward the ring die by a round-over punch. This process allows for a selective reduction of the diameter of the first cup-shaped feature 90 to form first cup-shaped feature 90'. The first cup-shaped feature 90' is formed to a desired diameter through a series of reductions because a draw process reducing a diameter may thin or tear the sheet 80. Further, multiple small reductions of the diameter of a cup-shaped feature reduces fatigue and increases the overall strength of the cup-shaped feature. The reduction of the first cup-shaped feature 90 of the present invention may include five successive reduction steps to form the desired first cup-shaped feature 90. More (as many as thirteen to twenty-five should prove adequate, but the maximum number of reductions is significantly greater and can be several hundred) or fewer (as few as one) reductions may be employed depending on the material and application.

Figure 14:
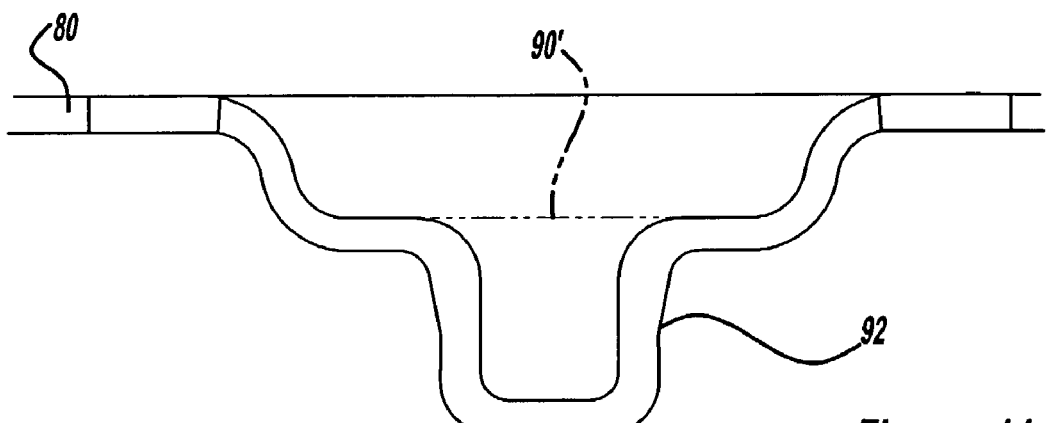
FIG. 14 is a cross sectional view of a side plate after the second drawing step in the method of FIG. 6.

In Step 140, the first cup-shaped feature 90 created in Step 120 and reduced in Step 130 is drawn to form a second cup-shaped feature 92 concentric with the first cup-shaped feature 90, as shown in FIG. 14. The flat top surface of the first cup-shaped feature 90 is positioned adjacent to a ring die and impacted on a flat portion 94 by a round-over die to form the second cup-shaped feature 92. It is again desirable that the second cup-shaped feature 92 be drawn to the largest diameter possible to reduce the chances of thinning or tearing the material or weakening the structure through fatigue.

Figure 15:
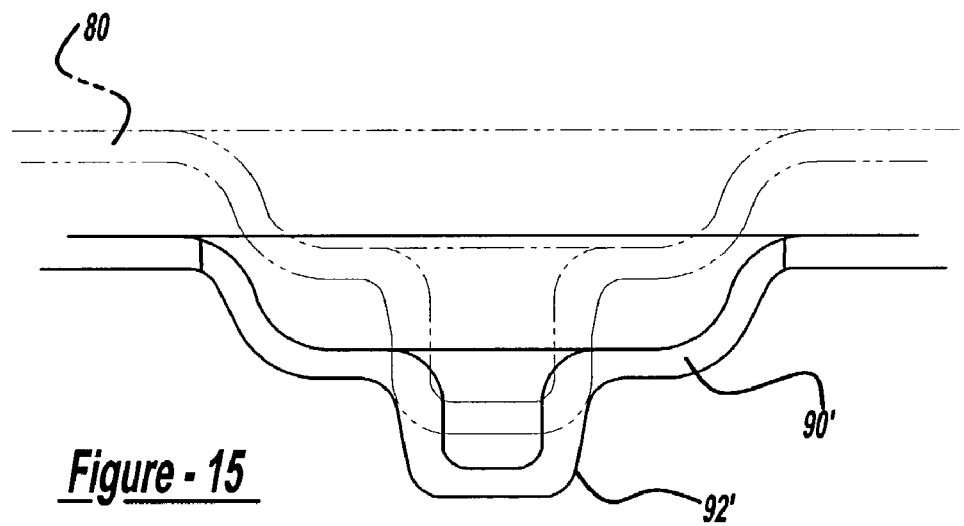
FIG. 15 is a cross sectional view of a side plate after the second reducing step in the method of FIG. 6.

In Step 150, the second cup-shaped feature 92 is reduced to from a second cup-shaped feature 92' having a smaller diameter, as shown in FIG. 15. As stated above, the process of reducing allows the structure to be formed through a series of steps to lessen fatigue and maintain overall strength of the structure. In the present example, three successive reductions may be used to form second cup-shaped feature 92'. More (as many as thirteen to twenty-five should prove adequate, but the maximum number of reductions is significantly greater and can be several hundred) or fewer (as few as one) reductions can be employed depending on the material and application.

Figure 16:
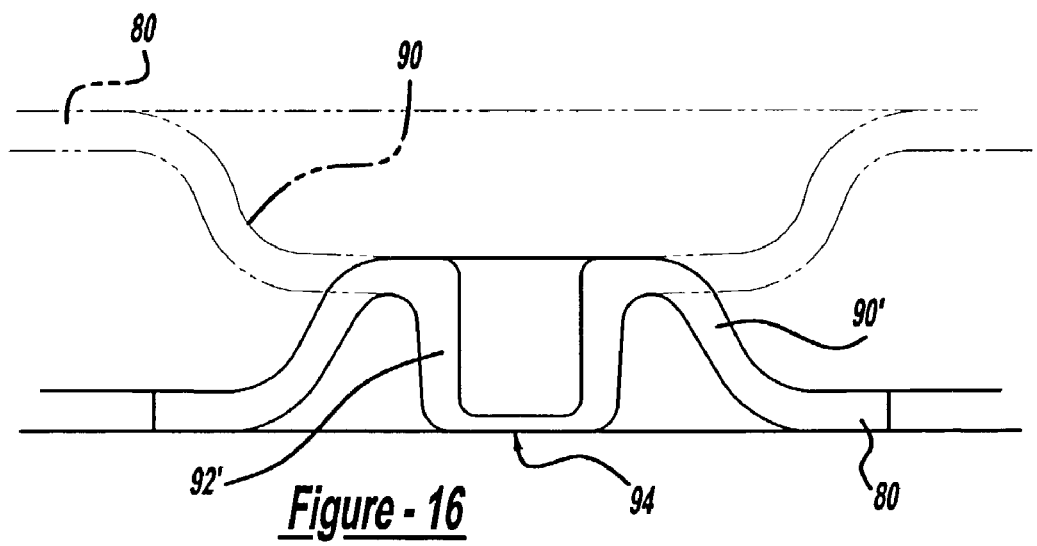
FIG. 16 is a cross sectional view of a side plate after the reverse drawing step in the method of FIG. 6.

In Step 160, the first cup-shaped feature 90' is reverse drawn to form the basic structure of integrally formed boss 62, as shown in FIG. 16. A roll-over die having a hole in the center is positioned around the second cup-shaped feature 92'. A ring die having an opening sized to accommodate the roll-over die and the thickness of the sheet 80 positioned adjacent to the opening of the first cup-shaped feature 90'. When the roll-over die impacts the second cup-shaped feature 92', it forces the second cup-shaped feature 92' into the first cup-shaped feature 90'. The first cup-shaped feature 90' forms around the perimeter of the ring die to form a third cup-shaped feature 94 including the second cup-shaped feature 92' inversely shaped to the first cup-shaped feature 90'.

Figure 17:
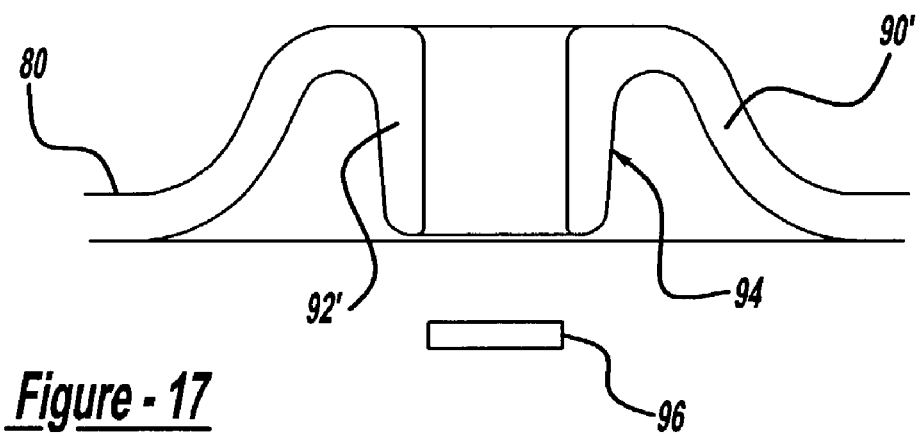
FIG. 17 is a cross sectional view of a side plate after the second piercing step in the method of FIG. 6.

In Step 170, the bottom of the third cup-shaped feature 94 is removed by piercing, as shown in FIG. 17. In this step, a pierce, similar to that used in Step 100, removes a circular shaped section 96 having a diameter generally similar to the inner diameter of the second cup-shaped feature 92 from the bottom of the third cup-shaped feature 94.

Figure 18:
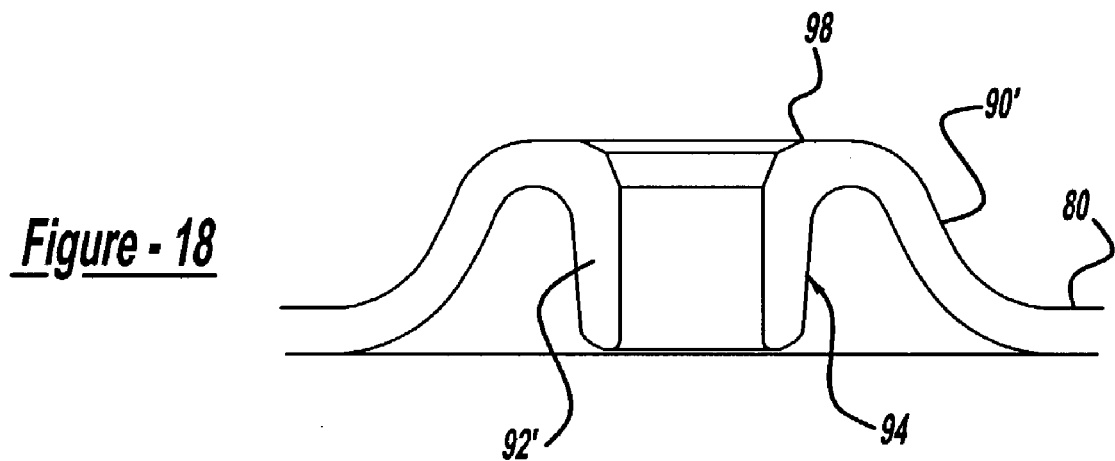
FIG. 18 is a cross sectional view of a side plate after the coining step in the method of FIG. 6.

In Step 180, a surface 98 joining the first and second cup-shaped features 90', 92' is coined to form a collar, as shown in FIG. 18. In the present example, coining is used to form a desired radius between the first and second cup-shaped features 90', 92' of the third cup-shaped feature 94, respectively.

Figure 19:
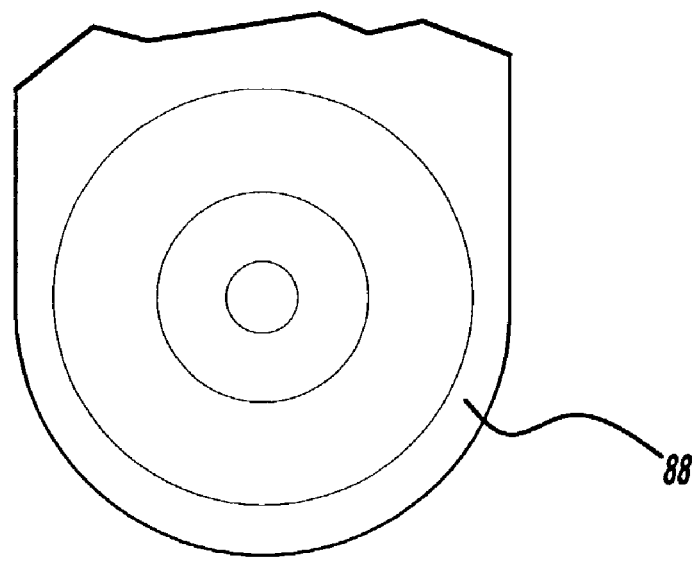
FIG. 19 is a partial side view of a side plate after the trimming step in the method of FIG. 6.

In Step 190, the perimeter of the peninsular section 88 is trimmed to create a desired shape and remove any sharp edges created during stamping, as shown in FIG. 19. In the preferred method, the perimeter of the peninsular section 88 is shaped to a curve tangential to each of the sides of the side plate 50.

In Step 200, side plate 50 is cut from the sheet 80. This process separates side plate 50 from the sheet 80 for further processing or assembly into a recliner assembly.

In Step 210, the interior of the second cup-shaped feature 92', is threaded. It is preferred that the interior of the second cup-shaped feature 92' be threaded starting at the coined surface 98 that connects the first and second cup-shaped features 90', 92' of the third cup-shaped feature 94.

As noted above, linear recliner assembly 10 includes side plate 50, as well as a similar side plate 52. Linear recliner assembly 10 is assembled by forming a pair of side plates 50, 52 (as described above), latching mechanism 26, recliner rod 28 and installing recliner actuator mechanism 30; installing spacers, and affixing side plates 50, 52 to each other. Fasteners 8 attach the linear recliner assembly 10 to seat frame 18 through threaded reception in integrally formed boss 62 of each side plate 50, 52. It is understood that more or fewer steps may be employed to manufacture and assemble linear recliner assembly 10 according to the invention.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A seat adjustment assembly, comprising:
    a recliner mechanism;
    a housing supporting said recliner mechanism and including a generally planar portion;
    a frustum-conical segment formed from said housing and extending generally outward from and adjacent to said generally planar portion of said housing;
    a hole through said frustum-conical segment; and
    a contact surface at a distal end of said frustum-conical segment and about said hole.

2. The recliner mechanism of claim 1, further comprising a collar extending generally inward from said contact surface and about said hole.

3. The recliner mechanism of claim 1, wherein said frustum-conical segment includes a plurality of threads located about a length of said hole.

4. The recliner mechanism of claim 1, wherein the edge between said frustum-conical segment and said contact surface includes a radiused edge.

5. The recliner mechanism of claim 1, wherein the edge between said frustum-conical segment and said planar portion includes a radiused edge.

6. A recliner mechanism comprising:
    an actuator;
    a housing having inner and outer housing plates supporting said actuator with each of the inner housing plate and outer housing plate having a main body;
    a first cup-shaped feature formed of said main body of said inner housing plate;
    a second cup-shaped feature formed of said main body of said outer housing plate;
    a third cup-shaped feature formed of said first cup-shaped feature, said third cup-shaped feature having a diameter smaller than said first cup-shaped feature and oriented in a direction opposite said first cup-shaped feature; and
    a fourth cup-shaped feature formed of said second cup-shaped feature, wherein said third cup-shaped feature of said inner housing plate is aligned with said fourth cup-shaped feature of said outer housing plate when said inner housing plate is attached to said outer housing plate.

7. The recliner mechanism of claim 6, further comprising a hole formed through said second cup-shaped feature.

8. The recliner mechanism of claim 6, further comprising a coined edge between said first cup-shaped feature and said second cup-shaped feature.

9. The recliner mechanism of claim 6, wherein said second cup-shaped feature includes a generally upwardly extending wall segment and a flat top portion.

10. The recliner mechanism of claim 6, wherein said first cup-shaped feature and said second cup-shaped feature form a frustum-conical segment extending generally outward from said main body.

11. The recliner mechanism of claim 10, further comprising a contact surface at a distal end of said frustum-conical segment.

12. The recliner mechanism of claim 11, further comprising a hole formed through said frustum-conical segment, wherein said contact surface is disposed about said hole.

13. The recliner mechanism of claim 12, further comprising a collar extending generally inward from said contact surface and about said hole.

14. The recliner mechanism of claim 12, wherein said frustum-conical segment includes a plurality of threads located about a length of said hole.

15. The recliner mechanism of claim 12, wherein said frustum-conical segment and said contact surface include a radiused edge therebetween.

16. The recliner mechanism of claim 12, wherein said frustum-conical segment and said main body include a radiused edge therebetween.

* * * * *